United States Patent
Rao

(10) Patent No.: US 12,461,930 B2
(45) Date of Patent: Nov. 4, 2025

(54) SYSTEM AND METHOD EXECUTING INTELLIGENT AUTOMATION FOR PROVIDING INSIGHTS OF AN INFORMATION TECHNOLOGY ECOSYSTEM

(71) Applicant: Hexaware Technologies Limited, Navi Mumbai (IN)

(72) Inventor: Sanjesh Rao, Haymarket, VA (US)

(73) Assignee: HEXAWARE TECHNOLOGIES LIMITED, Navi Mumbai (IN)

( * ) Notice: Subject to any disclaimer, the term of this patent is extended or adjusted under 35 U.S.C. 154(b) by 0 days.

(21) Appl. No.: 18/421,279

(22) Filed: Jan. 24, 2024

(65) Prior Publication Data
US 2025/0028732 A1    Jan. 23, 2025

(30) Foreign Application Priority Data
Jul. 20, 2023   (IN) .............................. 202321049059

(51) Int. Cl.
G06F 16/00   (2019.01)
G06F 16/23   (2019.01)
G06F 16/25   (2019.01)

(52) U.S. Cl.
CPC ........ G06F 16/254 (2019.01); G06F 16/2365 (2019.01)

(58) Field of Classification Search
None
See application file for complete search history.

(56) References Cited

U.S. PATENT DOCUMENTS

| | | | |
|---|---|---|---|
| 2014/0204816 A1* | 7/2014 | Ismail | H04W 52/0258 370/311 |
| 2016/0147975 A1* | 5/2016 | Han | G16H 50/70 705/2 |
| 2017/0235848 A1* | 8/2017 | Van Dusen | G06Q 10/101 705/12 |

FOREIGN PATENT DOCUMENTS

CA   3178244 A1 *  11/2021 ........... A61B 5/0002

* cited by examiner

Primary Examiner — Tuankhanh D Phan
(74) Attorney, Agent, or Firm — Muncy, Geissler, Olds & Lowe, P.C.

(57) ABSTRACT

The present subject matter discloses a system and a method for providing insights of an information technology ecosystem. The system comprises an ingestion module for ingesting at-least one data attribute from at least one data source into a data lake and a data analysis module for generating a dataset using data validation rules, wherein the data validation rules converts the at-least one data attribute to a predetermined format, and for generating at least one service request. Furthermore, the system comprises an automation module for determining a class of the at least one service request, wherein the class of at least one service request is determined based upon the dataset, wherein the class of at least one service request identifies a service provider from a plurality of service providers. Moreover, the automation module executes a pre-determined action based upon the class of the at least one service request and the identified service provider, wherein the pre-determined action provides a predictive insight in real-time.

16 Claims, 4 Drawing Sheets

SYSTEM AND METHOD EXECUTING INTELLIGENT AUTOMATION FOR PROVIDING INSIGHTS OF AN INFORMATION TECHNOLOGY ECOSYSTEM

FIELD OF THE INVENTION

The present disclosure generally relates to the field of process automation, more specifically the present disclosure relates to a system and method executing intelligent automation for providing insights of an information technology ecosystem to multiple users to enable automation service for automatically handling every foreseeable challenge within the information technology ecosystem without any human intervention.

BACKGROUND OF THE INVENTION

A contact center may be associated with a product and/or service provider for end users. Contact centers may provide a platform for users or consumers of related products and services with a platform for handling tasks, questions, issues, orders, account reviews, etc. related to the products and/or services. In some cases, the contact centers may employ agents who manually process incoming communication sessions with users. The contact centers may also use digital assistance, such as bots, to automatically handle communication sessions with users. As generally known, the communication sessions held between users and agents usually take a high cost in terms of time and effort from the user.

Users may not have certain information or may take a long time to find the necessary information. Conventional approaches implemented at the contact centers may fail to recognize when the cost is lower in using the bots in terms of increasing the quality of interactions and reducing interaction costs. As such, the conventional approaches may not determine the type of situations in which the use of bots may function well in proper order. Furthermore, the traditional approach in such situations is that once the user's communication session is transferred to the agent, it usually does not transfer the communication session back to the bot when the agent will complete the interaction.

In general, bot scripts can be run to automate data processing and task management. However, as the data volumes grow and becomes increasingly dynamic and complex, traditional bot scripts suffer from a significant lack of efficiency. Configuring bot scripts to correctly recognize target outcomes for task management is often difficult. Further, bot scripts may erroneously process tasks in a queue, and as a result, overall system load can become unbalanced, or processing resources can become unduly burdened. Also, bot scripts also typically cannot handle processing tasks across multiple different environments.

Conventionally, there have been resources being dedicated to implementing bot applications to provide quasi-computer-generated responses to on-line inquiries. However, traditional approaches are not suitable for multiplexing across different data protocols, different communication paths, different computing platforms, and the like. Such applications generally are limited to communicating with a specific communication channel. For an instance, there are several automation tools available that focus on specific areas of IT automation.

However, the industry lacks an integrated automation platform that can perform intelligent automation across the entire organization. Existing tools in the market cater to only specific areas of agility, efficiency, or experience. In one example, build automation tools available for automation of processes related to cloud costs, cloud management, cybersecurity, or AIOps. Similarly, there are tools available that help with features like chatbots or voice-related communication and automation, catering to the experience dimension.

Additionally, there are automation tools for specific areas of ITOps automation. For example, there is security orchestration, automation, and response platforms that are limited in their scope and focus. For an instance, they do not provide a single unified automation fabric that can deliver automation. Furthermore, there is a large correlation between the three dimensions that these individual tools cannot cover. Therefore, there exists a need to develop an automation platform that would address the three dimensions of an ecosystem: agility, efficiency, and experience.

SUMMARY OF THE INVENTION

This summary is provided to introduce concepts related to systems and methods for application environment migration and the concepts are further described below in the detailed description. This summary is neither intended to identify essential features of the claimed subject matter nor is it intended for use in determining or limiting the scope of the claimed subject matter.

In one implementation, a system for providing insights of an information technology ecosystem is disclosed. The system comprises a processor and a memory coupled to the processor, wherein the processor executes a plurality of modules stored in the memory. The plurality of modules further comprises an ingestion module for ingesting at-least one data attribute from at least one data source into a data lake. The plurality of modules further comprises an data analysis module for generating a dataset using data validation rules, wherein the data validation rules converts the at-least one data attribute to a predetermined format, and for generating at least one service request. Further, the plurality of modules further comprises an automation module in communication with the ingestion module and the control module, wherein the automation module is to determine a nature of the at least one service request, wherein the class of at least one service request is determined based upon the dataset wherein the class of at least one service request identifies a service provider from a plurality of service providers. The automation module is to further execute a pre-determined action based upon the class of the at least one service request and the identified service provider, wherein the pre-determined utilizes provides a one predictive insight in real-time.

In yet another implementation, the system further comprising an integration adapter for allowing a plurality of users to access a plurality of products associated with the third-party information technology ecosystem.

In yet another implementation, wherein the automation module, for orchestrating the plurality of service providers based on the service request to enable collaboration of the multiple users within the ecosystem.

In yet another implementation, the system authenticates and authorizes security module for allowing a plurality of users to access the information technology ecosystem and a third-party information technology ecosystem from multiple locations.

In yet another implementation, the system has at least one data attribute comprises a real-time data and/or historical data received from the at least one data source.

In yet another implementation, the system further comprises a security module, communicatively coupled to the system to receive a notification related to a non-steady state of the information technology ecosystem, wherein the automation module generates a set of risk profile data structures based upon the at-least one data attributes to determine the non-steady state of the ecosystem.

In yet another implementation, the system further comprises the security module, communicatively coupled to the system to perform analysis by employing at least one of artificial intelligence technique on at-least one data attributes.

In yet another implementation, the system further comprises the security module, communicatively coupled to generate a suggestive report to provide a favourable solution based upon the set of risk profile data structures, wherein the favourable solution indicates a list of factors responsible for non-processing of the one or more data attributes obtained from the at least one data sources.

In yet another implementation, the system predicts a standardized code classifying the at-least one data attributes and automatically executing the pre-determined action based on the at least one predictive parameter.

In yet another implementation, the system further comprises at least one service channel to analyze a user behaviour and user questions pertaining to the at least one service request.

In yet another implementation, the system further comprises at least one service channel to send to the user a tracking information about the service request.

In one implementation, a method for providing insights of an information technology ecosystem. The method comprises the step of ingesting at-least one data attributes from data sources into a data lake. The method further comprises the step of generating a dataset using data validation rules converts the at-least one data attribute to a predetermined format, and for generating at least one service request for facilitating a pre-determined action, and for generating at least one service request, wherein the nature of at least one service request identifies a service provider from a plurality of service providers. Thereafter, the method comprises the step of executing a pre-determined action based upon the class of the at least one service request and the identified service provider, wherein the pre-determined action provides a predictive insight in real-time.

In yet another implementation, the system has at least one integration adapters allowing the multiple users to access a plurality of products associated with the third-party information technology ecosystem.

In yet another implementation, the system comprises an Application Programming Interface (API) orchestrator operatively coupled to the automation module, for orchestrating the plurality of service providers based on the service request to enable collaboration of the multiple users within the ecosystem.

In yet another implementation, the system has an authenticating and authorizing service to allow the users to access the ecosystem and the third-party ecosystem from multiple locations.

In yet another implementation, the system has at least one data attribute comprises a real-time data and/or historical data received from the at least one data source.

In another implementation, the system comprises a security module, communicatively coupled to the system, wherein said security module is configured to receive a notification related to a non-steady state of the information technology ecosystem, wherein the automation module generates a set of risk profile data structures based upon the at-least one data attributes to determine the non-steady state of the ecosystem.

In another implementation, the system comprises the security module to perform analysis by employing at least one of artificial intelligence technique on at-least one data attributes In another implementation, the system comprises the security module to generate a suggestive report to provide a favourable solution based upon the set of risk profile data structures, wherein the favourable solution indicates a list of factors responsible for non-processing of the one or more data attributes obtained from the at least one data sources.

In another implementation, the system comprises the step of predicting a standardized code classifying the at-least one or more data attributes and automatically executing the pre-determined action based on the at least one predictive parameter.

In another implementation, the system comprises comprising at least one service channel for analyzing a user behaviour and user questions pertaining to the at least one service.

In another implementation, the system comprises comprising at least one service channel for sending to the user a tracking information about the service request.

These and other implementations, embodiments, processes and features of the subject matter will become more fully apparent when the following detailed description is read with the accompanying experimental details. However, both the foregoing summary of the subject matter and the following detailed description of it represent one potential implementation or embodiment and are not restrictive of the present disclosure or other alternate implementations or embodiments of the subject matter.

BRIEF DESCRIPTION OF THE DRAWINGS

A clear understanding of the key features of the subject matter summarized above may be had by reference to the appended drawings, which illustrate the method and system of the subject matter, although it will be understood that such drawings depict preferred embodiments of the subject matter and, therefore, are not to be considered as limiting its scope with regard to other embodiments which the subject matter is capable of contemplating. Accordingly.

DETAILED DESCRIPTION OF THE INVENTION

Figure 1:
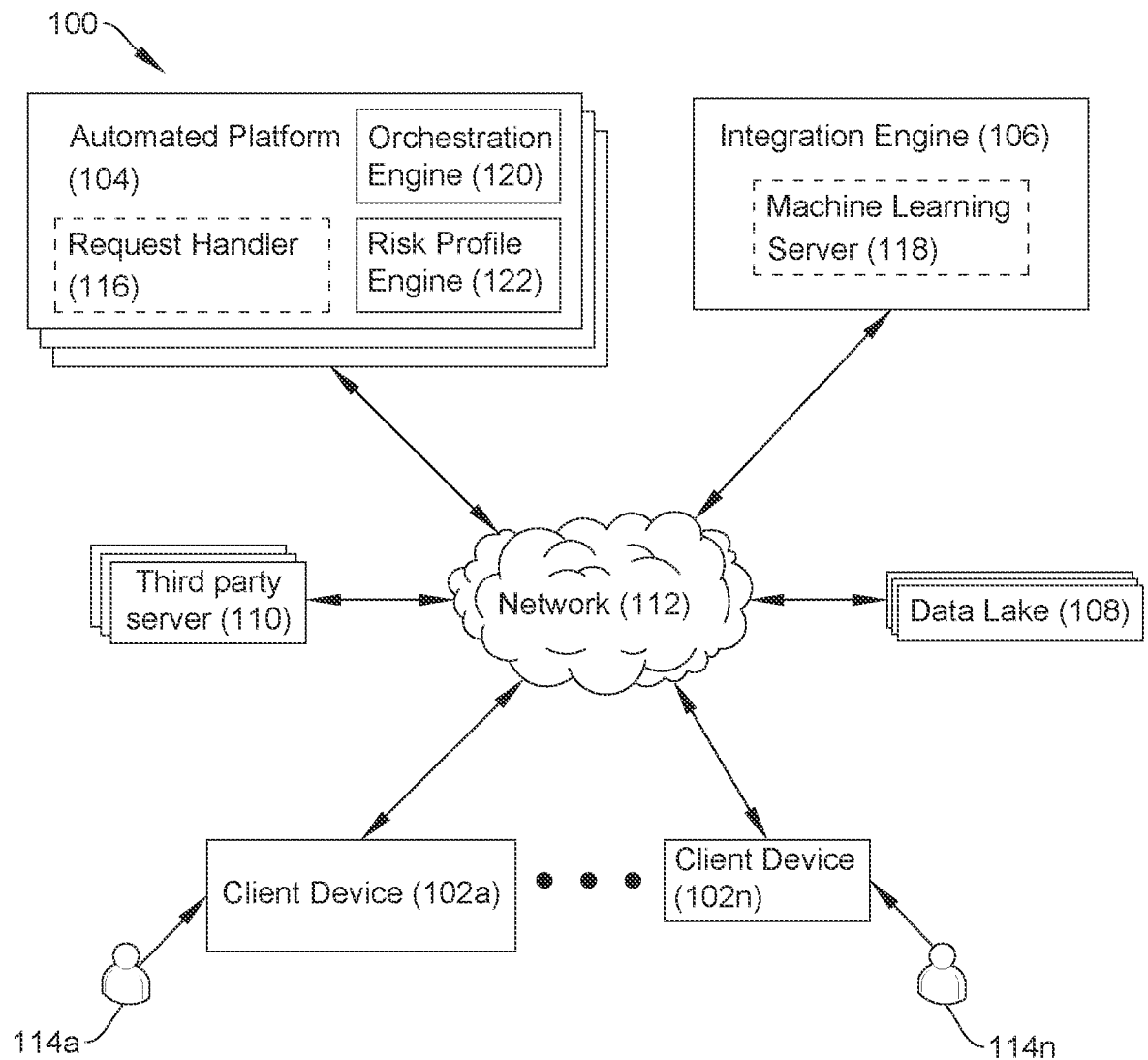
FIG. 1 illustrates an exemplary environmental diagram of a system providing insights of an organisation to multiple users, in accordance with an embodiment of the present subject matter.

The following is a detailed description of implementations of the present disclosure depicted in the accompanying drawings. The implementations are in such detail as to clearly communicate the disclosure. However, the amount of detail offered is not intended to limit the implementations, but it is to cover all modifications, equivalents, and alternatives falling within the spirit and scope of the present disclosure. While aspects of described systems and methods for integration application environment migration can be implemented in any number of different computing systems, environments, and/or configurations, the embodiments are described in the context of the following exemplary system(s).

The techniques introduced herein provides a system and method for automating and streamlining the key dimensions: agility, efficiency, and experience of an organization. In some implementations, the system and methods of the present disclosure uses artificial intelligence (AI) and machine learning (ML) based approaches to significantly improve and automate workflow pipeline and associated classification processing in a global service. For a seamless execution of import/export activity, work pipeline needs to be classified appropriately by assigning data attributes to each activity. For example, in the context of a manager that can request an email ID for a new employee and add the employee to multiple distribution lists.

The classification of work pipeline using various business logics is mandatory for delivering value stream insights that align the flow metrics and dora metrics to cater to all personas within the organization. For example, the data attributes assigned during its classification is used for customs reporting and to determine a unified solution that fulfills request related to infrastructure management, security, compliance, and employee requests, and many others.

In particular, the systems and methods of the present disclosure utilize system-agnostic machine learning enabling users to access and analyze data in a way that is customized to their specific needs. In one case, the machine learning models may create customized and specific models using artificial intelligence for deploying in an automated process that minimizes human error in the work pipeline. There are several automation tools available that focus on areas of IT automation for automation of processes related to cloud costs, cloud management, cybersecurity, or AI OPS. Ideally, the industry lacks a single unified extreme automation platform that can perform intelligent automation across the entire organization. Moreover, such a platform avoids business disruptions and address the three dimensions of the organization: agility, efficiency, and experience. The systems and methods described below for automating and streamlining the work pipeline may ensure faster work classification, increased accuracy, data consistency, and mitigate the business risk of compliance errors.

While the present disclosure may describe the techniques herein in the context of an example SaaS-based single platform providing flexibility of onboarding multiple products onto the single platform, it should be understood that the architecture, principles, and components of the present disclosure may also be used to provide automated services in various other contexts that involve tasks, for example, feeding all the service requests and incidents, tracing and monitoring errors, delivering predictive insights, timely analysis and decision-making, and the like. As, such the proposed automated work pipeline system facilitates automation into an organization across all dimensions of services, i.e., agility, efficiency, and experience.

In some implementations, the AI/ML learning of the present disclosure also has application within work pipeline, specific areas in the engineering organization for managing customer portfolios, analyzing nature of service request, orchestrating the use of service providers, detecting anomalies and correlation of data. In one example, the requests may correspond to website traffic or maintenance of M365 components. In such a case, the appropriate service provider can execute all of these tasks, update the ticket, and let the authorized party know that a new employee is ready to get started, and all of the requests have been provisioned.

In organizational management, the architecture, principles, and components of the present disclosure may utilize a micro-service architecture to provide data-driven insights to users by extracting, transforming, and publishing data from multiple sources. In yet other implementations, the architecture, principles, and components of the present disclosure may be a web-based interface that provides end-users with a self-service portal to access and request services from an organization. The portal is fully customizable to match the organization's branding, making it familiar and more accessible for users through work order request rules. Therefore, the systems and methods described below may be applied to various other areas of automation in addition to those specifically set forth below.

FIG. 1 is a high-level block diagram illustrating one implementation of an example system 100 for automating and streamlining key dimensions of an organization and automatically executing an actionable item based on requirement of a work pipeline. The illustrated system 100 may include one or more client devices 102a . . . 102n that can be accessed by users, at least one automation platform 104, an integration engine 106, a data lake 108, and a plurality of third-party servers 110 which are communicatively coupled via a network 112 for interaction and electronic communication with one another. In FIG. 1 and the remaining figures, a letter after a reference number, e.g., "102a," represents a reference to the element having that particular reference number. A reference number in the text without a following letter, e.g., "102," represents a general reference to instances of the element bearing that reference number.

The network 112 may be a conventional type, wired or wireless, and may have plurality of different configurations including a token ring configuration, star configuration, or other configurations. Further, the network 112 may include any number of networks and/or network types. For example, the network 112 may include a wide area network (WAN) (e.g., the Internet), a local area network (LAN), virtual private networks (VPNs), wireless wide area network (WWANs), WiMAX® networks, Bluetooth® communication networks, mobile (cellular) networks, peer-to-peer networks, near field networks (e.g., NFC, etc.), and/or other interconnected data paths across which multiple devices may communicate, various combinations thereof, etc. The network 112 may also be coupled to or include portions of a telecommunications network for receiving or sending data in a variety of different communication protocols. In some implementations, the data transmitted by the network 112 may include packetized data (e.g., Internet Protocol (IP) data packets) that is routed to designated computing devices coupled to the network 112. In some implementations, the network 112 may include Bluetooth communication networks or a cellular communications network for sending and receiving/sending data including via short messaging service (SMS), multimedia messaging service (MMS), hypertext transfer protocol (HTTP), direct data connection, WAP, email, etc. Although FIG. 1 illustrates one network 112 coupled to the client devices 102, an automation platform 104, an integration engine 106, a data lake 108, and a plurality of third-party servers 110, in practice one or more networks 112 may be connected to these entities.

The client devices 102a . . . 102n (also referred to individually and collectively as 102) may be computing devices having data processing and communication capabilities. In some implementations, the client devices 102 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 102 may couple to and communicate with one another and the other entities of the system 100 via the network 112 using a wireless and/or wired connection. Examples of client devices 102 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing other components of the system 100. In the example of FIG. 1, the client device 102 is configured to access the automation platform 104, the integration engine 106, the data lake 108, or third-party servers 110, as described in more detail below.

The client device 102 includes a display for viewing information provided by one or more entities coupled to the network 112. For example, the client device 102 may be adapted to send and receive data to and from one or more of the automation platforms 104 an integration engine 106, a data lake 108, and a plurality of third-party servers 110. While two or more client devices 102 are depicted in FIG. 1, the system 100 may include any number of client devices 102. In addition, the client devices 102a . . . 102n may be the same or different types of computing devices. The client devices 102a . . . 102n may be associated with the users 114a . . . 114n. For example, users 114a . . . 114n may be authorized personnel including managers, engineers, technicians, administrative staff, etc. of a business organization. Each client device 102 may be associated with a data channel, such as web, mobile, enterprise, and/or cloud applications. For example, the client device 102 may include a web browser to allow authorized personnel to access the functionality provided by entities, specifically the automation platform 104 of the system 100 coupled to the network 112.

In the example of FIG. 1, the entities of the system 100, such as the client device 102, the integration engine 106, the data lake 108, and the plurality of third-party servers 110 may be, or may be implemented by a request handler 116 including a processor, a memory, applications, a database, and network communication capabilities similar to that described below with reference to FIG. 2. In some implementations, each one of the entities 102, 106, 108, and 110 of the system 100 may be a hardware server, a software server, or a combination of software and hardware. For example, the plurality of third-party servers 110 may include one or more hardware servers, virtual servers, server arrays, storage devices and/or systems, etc., and/or may be centralized or distributed/cloud based. In some implementations, each one of the entities 102, 106, 108, and 110 of the system 100 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, each one of the entities 102, 106, 108, and 110 of the system 100 may be a Hypertext Transfer Protocol (HTTP) server, a Representational State Transfer (REST) service, or other server type, having structure and/or functionality for processing and satisfying content requests and/or receiving content from the other entities 102, 106, 108, and 110 and one or more of the client devices 102 coupled to the network 105.

In the example of FIG. 1, the automation platform 104 may be configured to implement a request handler 116. Also, instead of or in addition, the automation platform 104 may implement its own application programming interface (API) for facilitating access of the automation platform 104 by other entities and the transmission of instructions, data, results, and other information between other entities 102, 106, 108, and 110 communicatively coupled to the network 112. For example, the API may be a software interface exposed over the HTTP protocol by the automation platform 104. The API exposes internal data and functionality of an online service hosted by the automation platform 104 to API requests originating from one or more of client devices 102, the plurality of third-party servers 110, or the request handler 116. In some implementations, the automation platform 104 may include the online service dedicated to providing access to various services and information resources hosted by the automation platform 104 via web, mobile, enterprise, and/or cloud applications. In one example, the online service may be software as a service (SaaS). The online service may offer various services, such as feeding all the service requests and incidents, tracing and monitoring errors, delivering predictive insights, timely analysis and decision-making services related to the organization.

For example, in the context of feeding all the service requests and incidents, the online service may utilize plurality of service providers to automate work pipeline. It should be noted that the list of services provided as examples for the online service above are not exhaustive and that others are contemplated in the techniques described herein. In some implementations, the automation platform 104 may also include a database (not shown) coupled to it (e.g., over the network 112) to store structured data in a relational database and a file system (e.g., HDFS, NFS, etc.) for unstructured or semi-structured data. It should be understood that a single automation platform 104 may be representative of an online service provider and there may be multiple online service providers coupled to the network 112, each having its own server or a server cluster, applications, application programming interface, etc.

In the example of FIG. 1, a machine learning server 118 may be configured to implement the automation platform 104. The machine learning server 118 may be configured to send and receive data and analytics from one or more of client devices 102, the automation platform 104, the integration engine 106, the data lake 108, and the plurality of third-party servers 110, via the network 112. For example, the machine learning server 118 receives product attributes and corresponding classifications from the automation platform 104. The machine learning server 118 may be configured to curate training datasets and implement machine learning techniques to train and deploy one or more machine learning models based on training datasets of the automation platform 104. In some implementations, the machine learning server 118 may also include a database coupled to it (e.g., over the network 112) to store structured data in a relational database and a file system (e.g., HDFS, NFS, etc.) for unstructured or semi-structured data. In some implementations, the machine learning server 118 may include an instance of a data store that stores various types of data for access and/or retrieval by the automation platform 104. For example, the data store may store machine learning models for predicting parameters for classifying products. Other types of user data are also possible and contemplated.

In some implementations, the machine learning server 118 may serve as a middle layer and permit interactions between the client device 102 and the plurality of the automation platform 104 and the third-party servers 110 to flow through and from the machine learning server 118 for security and convenience. In some implementations, the machine learning server 118 may be operable to receive new data as input, use one or more trained machine learning models to process the new data, and generate predictions accordingly, etc. It should be understood that the machine learning server 118 is not limited to providing the above-noted acts and/or functionality and may include other network-accessible services. In addition, while a single machine learning server 118 is depicted in FIG. 1A, it should be understood that there may be any number of machine learning servers 118 or a server cluster.

In the example of FIG. 1, the plurality of third-party servers 110 may utilize plug-n-play architecture providing flexibility to offer partner agnostic products or leverage existing customer infrastructure through the partner ecosystem to cater to hybrid environments. In some implementations, the automation platform 104 may communicate with the plurality of third-party servers 110 to provide services to users 114. In the context of managing organizational activities, the automation platform 104 may cooperate with the plurality of third-party servers 140 for compliance to facilitate a seamless execution of import/export workflow activity in the ecosystem 100. In some implementations, the machine learning server 118 may communicate with the plurality of third-party servers 110 for identifying one or more revisions or changes within the classification systems (and updating the training datasets accordingly.

In the example of FIG. 1, the data lake 108 may be a data warehouse, a system of record (SOR), or belonging to a data repository owned by the organization that provides a historical data, a real-time or close to real-time data automatically or responsive to being polled or queried by the automation platform 104 and the machine learning server 118. Each of the data in the data lake 108 may be associated with a first-party entity (e.g., client device 102, the automation platform 104) or third-party entity (e.g., server 110 associated with a separate company or service provider). Examples of data provided by the data lake 108 may relate to on-boarding of multiple products onto the automation platform 104. In some implementations, the data lake 108 may be configured to provide or facilitate an API (not shown) that allows the request handling application 116 to access data and information for performing the functionality described herein.

The request handler 116 may include software and/or logic to provide the functionality for classification of the service request and automatically execute an actionable item based on a nature of the service request. For an instance, when the manager has registered a new employee in the organisation, the request handler 116 may determine a nature of such an action executed by the manger. In one case, the request handler 116 may create an email ID for the new employee. In some implementations, the request handler 116 may be implemented using programmable or specialized hardware, such as a field-programmable gate array (FPGA) or an application-specific integrated circuit (ASIC). In some implementations, the request handler 116 may be implemented using a combination of hardware and software. In some implementations, the request handler 116 may be stored and executed on various combinations of the client device 102, the integration engine 106, and the plurality of third-party servers 110. As depicted in FIG. 1, the request handler 116 is shown in dotted lines to indicate that the operations performed by the request handler 116 as described herein may be performed at the client device 102, the integration engine 106, plurality of third-party servers 110, the machine learning server 118, or any combinations of these components. Additional structure, acts, and/or functionality of the request handler 116 is further discussed below with reference to FIG. 2.

In some implementations, the request handler 116 may further be configured with an orchestration engine 120 that may include software and/or logic to provide the functionality for orchestrating the plurality of service providers based on the service request to enable collaboration of the multiple users within system 100. In one case, the orchestration engine 120 may delivers a single sign-on capability, allowing users to seamlessly navigate through underlying products of the third-party server 110. In some implementations, the orchestration engine 120 may integrate with other identity access management products in the market that support Oauth2, SAML, and ODIC protocols, providing a flexible and scalable approach to identity management.

In one case, the orchestration engine 120 may correspond to a code operable in a web browser, a web application accessible via a web browser, a native application on the client device 102. While the orchestration engine 120 is described below as a stand-alone application, in some implementations, the orchestration engine 120 may be part of other applications in operation on the client device 102, the integration engine 106, and the third-party servers 110.

Further, the orchestration engine 120 may require users to be registered with the automation platform 104 to access the acts and/or functionality described herein. For example, to access various acts and/or functionality provided by the orchestration engine 120, the orchestration engine 120 may require a user to login via user interface for authenticating his/her identity to access the automation platform 104. For example, the orchestration engine 120 may require a user seeking access to authenticate their identity by inputting credentials in an associated user interface. In another example, the orchestration engine 120 may interact with a federated identity server (not shown) to register and/or authenticate the user by scanning and verifying biometrics including username and password, facial attributes, fingerprint, voice, and the like.

The request handler 116 may be configured with a Risk profile Engine 122 that may include software and/or logic to provide the functionality for realization, analysis, and prevention of operational risk in the system 100. In one case, the Risk profile Engine 122 may generate a set of risk profile data structures associated with the at-least one or more data attributes to determine a non-steady state of the ecosystem. For example, the system 100 may provide a number of services to its customers and employees, i.e., users 114, using a variety of applications. These applications may depend on the proper operation of one or more network devices such as web servers, application servers, databases, routers, network switches, or any other suitable network device. When the service request is made for the request handler 116, it is advantageous for the enterprise to determine how the service request may affect the network devices to identify potential risks associated with the implementation of the service request. By assessing the potential risks involved in updating the request handler 116, the system 100 may pre-emptively avoid network outages and operational failures.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from the automation platform 104 to a client device 102, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc. In some implementations, the request handler 116 may be implemented as a single unified platform will be described below with reference to FIG. 2.

Figure 2:
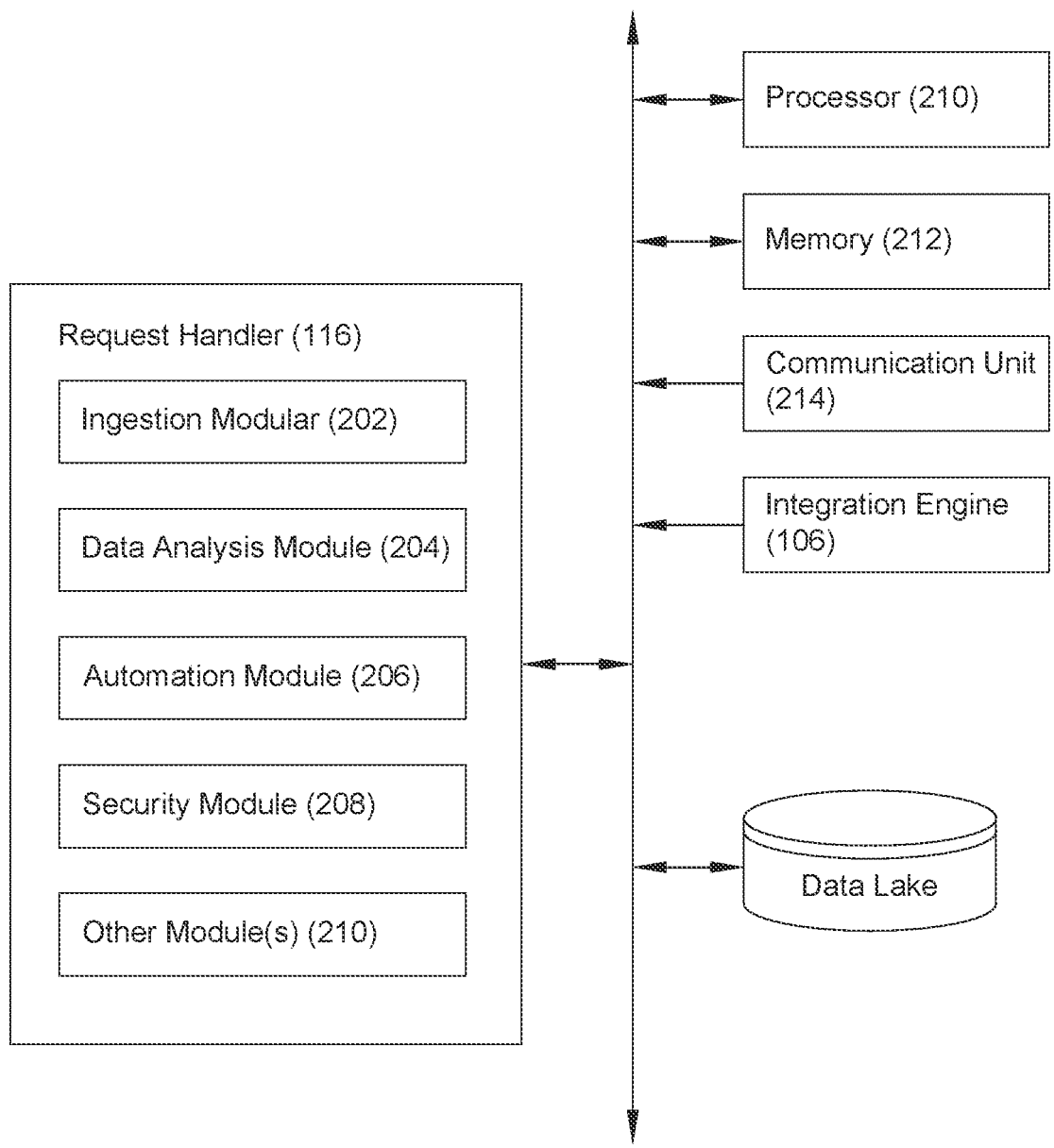
FIG. 2 illustrates a block diagram illustrating one implementation of an automation platform including a request handler, in accordance with an embodiment of the present subject matter.

FIG. 2 is a block diagram illustrating one implementation of a request handler 116 including a plurality of modules performed by any suitable combination of one or more servers or other components at one or more locations. In one example, the plurality of modules may include an ingestion module 202, a data analysis module 204, an automation module 206, a security module 208, and other module(s) 210. In the embodiment, where the modules are servers, the servers may be public or private servers, and each server may be a virtual or physical server. The server may include one or more servers at the same or at remote locations.

In one case, the request handler 116 may be configured with the ingestion module 202 for ingesting at-least one data attributes from one or more devices, i.e., client device 102 or third-party servers 110, operable to transfer the at-least one data attributes from distinct sources into the data lake 108. More specifically, the ingestion module 202 ingests all the data from the cloud and on-premise applications in client's environment and transform it into a pre-defined format for further processing of the at-least one data attributes.

In one case, the request handler 116 may be configured with the data analysis module 204 for generating a set of data using data validation rules to convert the at-least one data attributes to a predetermined format, wherein the set of data is transformed into at least one service request for facilitating a pre-determined action. For an instance, the data analysis module 204 may transform the at-least one data attributes based on the needs from an architectural and business standpoint and loads all of that data in real-time into the data lake 108.

In one case, the request handler 116 may be configured with the automation module 206 for determining a nature of the at least one service request, wherein the nature of at least one service request identifies a defined service provider from a plurality of service providers. In one example, the service provider may correspond to electronic agents, such as BOTs, for digitally interpreting and providing responses to present significant opportunities for new and improved modes of interaction between user 114 and the automation platform 104. The service provider may provide expressions of intent, such as online chat sessions, inputs to a speech recognition platform, or web content. By resolving intents from service requests of intent, certain service providers enhance the functionality of the connection between the user 114 and back-end system, such as automation platform 104, in that they accurately translate the user's intent-based requests into appropriate commands (for example, structured database queries) to be processed by back-end systems. In one example, the automation platform 104 may receive service request from a BOT engine (not shown) indicating the specific data to be retrieved and accordingly execute the actionable item.

The BOT engine may then retrieve the specific data requested from client device 102 and/or the data lake 108 and forwards the retrieved data as corresponding responses to the service requests. Further, the BOT engine may provide an execution environment for executing service providers/automated programs that perform a pre-defined set of actions, possibly by interacting with other systems such as client device 102. In one case, some service providers may run automatically, while others only execute commands when they receive specific inputs. In another case, some of the service providers may also facilitate predictive analytics using predictive algorithms. The BOT engine may predict a standardized code classifying the at-least one data attributes and automatically executing the pre-determined action based on the at least one predictive parameter. For example, the standardized code may provide predictive analytics to users, such as suggestions about the areas of IT operations, predictable TATs on service request fulfillment, predicting breakdowns in IT services, replenishment and the like. In one embodiment, the service provider (executing in BOT engine) performs predictive analytics (using predictive algorithms) on chat/collaboration history, chat context and commands given by users 114, during a chat/collaboration session, and render the results/suggestions to the participants. For example, when the user 114 sends a message (typically in the form of text) in a chat session indicating that a new laptop has to be assigned to a user entering the organization.

In one case, the at least one service request is classified based upon the set of data to analyze the nature of the at least one service request. Further, the automation module 206 may execute the pre-determined action based upon the nature of service request, wherein the pre-determined action utilizes at least one predictive parameter being generated based on correlation of the transformed set of data in real-time. Furthermore, the automation module 206 may provide predicted insights associated to the work pipeline based on the correlation of data received from at least one of the client devices 102, third party server 118, and the data lake 108, wherein the insights facilitate in timely analysis and decision-making of work-related assignments within the organization. In one case, the predictive insights may facilitate in diagnosis and maintenance of the automation platform 104.

Further, the predicts insights enables for the clients, i.e., user 114, to take necessary measures. For example, the predictive insights may ensure cost-efficient, high-performance IT service operations, predictable TATs on service request fulfillment, predicting breakdowns in IT services, replenishment and the like. The insights may further facilitate third party ecosystem to collaborate with the features already provided by existing ecosystem (or the automation platform 104) for successful requirement of the client to perform IT operations. The automation module 206 may further utilize the data from the entire ecosystem 100 to provide good visibility of the organizational insights, governance, risk and compliance (GRC) performance, occurrence of failures thereby facilitating, diagnostic and maintenance during breakdowns or malfunctioning of the automation platform 104.

In one case, the automation module 206 may collaborate with the machine learning server 118 may include software and/or logic to provide functionality for generating model training datasets and training one or more machine learning models using the training datasets. The machine learning server 118 uses the training datasets to train the machine learning models for performing the various functionalities as described herein. In some implementations, the machine learning server 118 curates one or more training datasets based on the data received and processed in association with one or more of the client devices 102, the automation platform 104, the third-party servers 110, and the data lake 118. For example, the machine learning server 118 may receive the historical data under different classification schemes for generating the training datasets. Example training datasets curated by the machine learning server 118 may include, but not limited to, a dataset of product attributes and client data received from client device 102 to predict TATs on service request fulfillment, breakdowns in IT services, thereby ensuring high-performance IT service operations.

Further, the request handler 116 may be configured with a security module 208 for determining a non-steady state of the ecosystem, wherein a signal indicating the non-steady state is received from the from one or more devices. In one case, the non-steady state may correspond to non-processing of the one or more data attributes obtained from the one or more devices. For example, the security module 208 on the client device 102 and the third-party server 110 may detect the errors and impurity of data attributes at its source, clean, and send the cleaned data to the request handler 116 instance in the automation platform 104. Further, additional structure and/or functionality of the request handler 116 is further discussed below with reference to FIG. 3.

Furthermore, the request handler 116 may also include a processor 210, a memory 212, and a communication unit 214, according to some examples. The components of the request handler 116 are communicatively coupled to each other and the data lake 108 by a bus 216. In such implementations where the request handler 116 is the client devices 102, an automation platform 104, an integration engine 106, the machine learning server 118, it should be understood that the client devices 102, an automation platform 104, the integration engine 106, the machine learning server 118 may take other forms and include additional or fewer components without departing from the scope of the present disclosure. For example, while not shown, the request handler 116 may include additional processors, and other physical configurations. Additionally, it should be understood that the computer architecture depicted in FIG. 2 could be applied to other entities of the system 100 with various modifications, including, for example, the plurality of third-party servers 110 and the data lake 108.

The processor 210 may execute software instructions by performing various input/output, logical, and/or mathematical operations. The processor 210 may have various computing architectures to process data signals including, for example, a complex instruction set computer (CISC) architecture, a reduced instruction set computer (RISC) architecture, and/or an architecture implementing a combination of instruction sets. The processor 210 may be physical and/or virtual and may include a single processing unit or a plurality of processing units and/or cores. In some implementations, the processor 210 may be capable of generating and providing electronic display signals to the client devices 102, supporting the display of images, capturing and transmitting images, and performing complex tasks. In some implementations, the processor 210 may be coupled to the memory 212 via the bus 216 to access data and instructions therefrom and store data therein. The bus 216 may couple the processor 210 to the other components of the request handler 116 including, for example, the memory 212, the communication unit 214, and the data lake 108.

The memory 212 may store and provide access to data for the other components of the request handler 116. The memory 212 may be included in a single computing device or distributed among a plurality of computing devices as discussed elsewhere herein. In some implementations, the memory 212 may store instructions and/or data that may be executed by the processor 210. The instructions and/or data may include code for performing the techniques described herein. For example, as depicted in FIG. 2, the memory 212 may store data related to the request handler 116. The memory 212 is also capable of storing other instructions and data, including, for example, an operating system, hardware drivers, other software applications, databases, etc. The memory 212 may be coupled to the bus 216 for communication with the processor 210 and the other components of the request handler 116.

The memory 212 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 210. In some implementations, the memory 212 may include one or more of volatile memory and non-volatile memory. It should be understood that the memory 212 may be a single device or may include multiple types of devices and configurations.

The bus 216 may represent one or more buses including an industry standard architecture (ISA) bus, a peripheral component interconnect (PCI) bus, a universal serial bus (USB), or some other bus providing similar functionality. The bus 216 may include a communication bus for transferring data between components of the request handler 116 or between the request handler 116 and other components of the system 100 via the network 112 or portions thereof, a processor mesh, a combination thereof, etc. In some implementations, the request handler 116 and various other software operating on the automation platform 104 (e.g., an operating system, device drivers, etc.) may cooperate and communicate via a software communication mechanism implemented in association with the bus 216. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The communication unit 214 is hardware for receiving and transmitting data by linking the processor 210 to the network 112 and other processing systems via signal line 218. The communication unit 214 may receive data such as service requests from the client devices 102 and transmit the service requests to the request handler 116, for example a request to a manager can request an email ID for a new employee and add the employee to multiple distribution lists. The communication unit 214 also transmits information including media to the client devices 102 for display, for example, in response to the request. The communication unit 214 is coupled to the bus 208. In some implementations, the communication unit 214 may include a port for direct physical connection to the client devices 102 or to another communication channel. For example, the communication unit 214 may include an RJ45 port or similar port for wired communication with the client device 102. In other implementations, the communication unit 214 may include a wireless transceiver (not shown) for exchanging data with the client device 102 or any other communication channel using one or more wireless communication methods, such as IEEE 802.11, IEEE 802.16, Bluetooth® or another suitable wireless communication method.

In yet other implementations, the communication unit 214 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still other implementations, the communication unit 214 may include a wired port and a wireless transceiver. The communication unit 206 also provides other conventional connections to the network 112 for distribution of files and/or media objects using standard network protocols such as TCP/IP, HTTP, HTTPS, and SMTP as will be understood to those skilled in the art.

The data lake 118 is a non-transitory memory that stores data for providing the functionality described herein. In some implementations, the data storage 118 may be coupled to the components 202-214 via the bus 216 to receive and provide access to data. In some implementations, the data lake 118 may store data received from other elements of the system 100 including, for example, entities 102, 104, 106, 110, and/or the request handler 116, and may provide data access to these entities. The data lake 118 may store, among other data, data attributes 220, set of data 222, user data 224, predictive parameter 226, other data 228. The data lake 118 stores data associated with automating and streamlining key dimensions of an organization and automatically executing an actionable item based on requirement of the work pipeline and other functionality as described herein. The data stored in the data lake 118 is described below in more detail.

The data lake 108 may be configured with the system 100 or in another computing device and/or storage system distinct from but coupled to or accessible by the request handler 116. The data lake 108 may include one or more non-transitory computer-readable mediums for storing the data. In some implementations, the data lake 108 may be incorporated with the memory 212 or may be distinct therefrom. The data lake 108 may be a dynamic random-access memory (DRAM) device, a static random-access memory (SRAM) device, flash memory, or some other memory devices. In some implementations, the data lake 108 may include a database management system (DBMS) operable on the request handler 116. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data lake 108 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. It should be understood that other processors, operating systems, displays, and physical configurations are possible.

Figure 3:
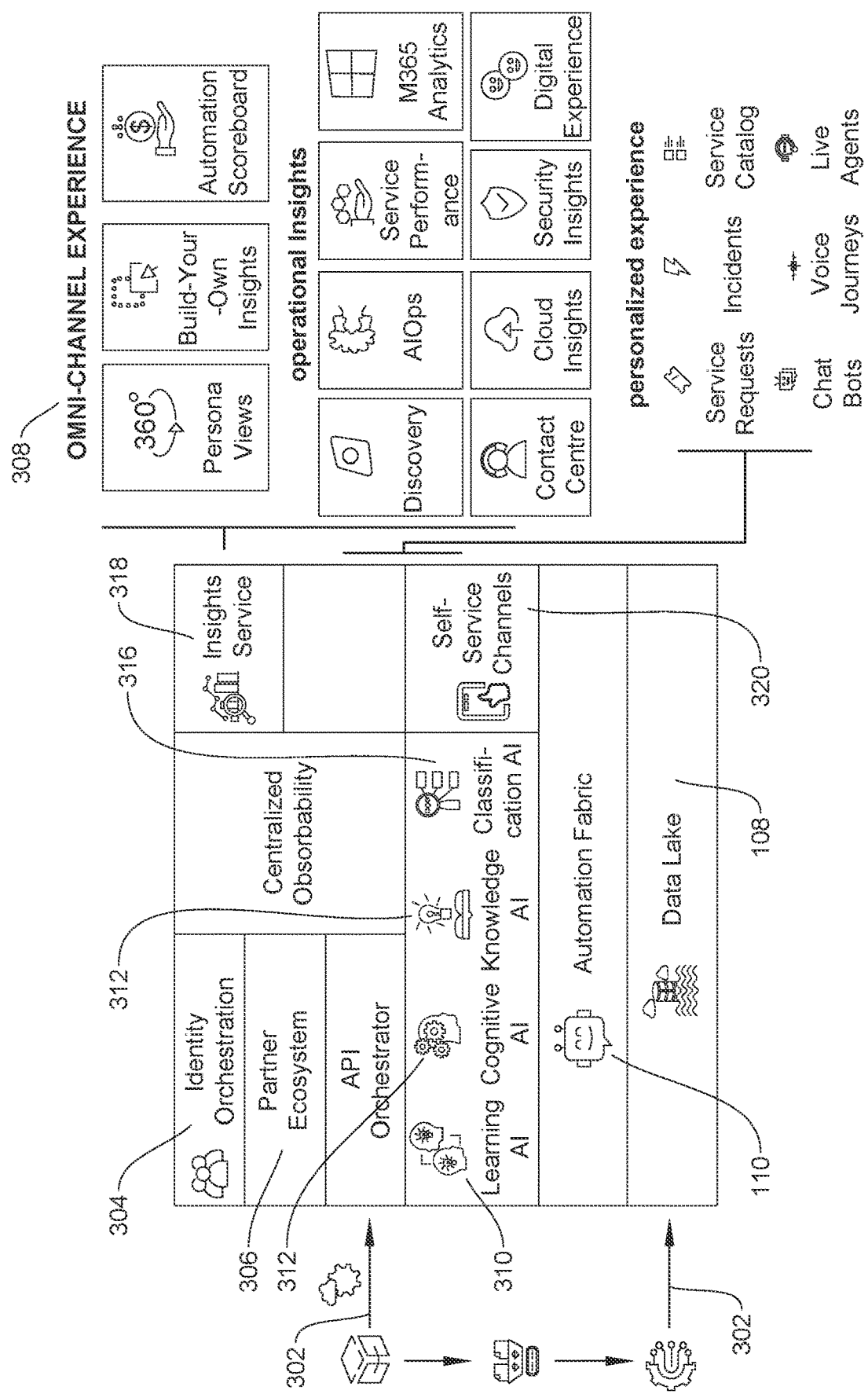
FIG. 3 illustrates a show graphical representation illustrating example predictive frameworks to automate workflow pipeline in the organisation, in accordance with an embodiment of the present subject matter.

FIG. 3 is a block diagram illustrating one implementation of an automation platform 104. In an example. block 302 may depict an ingestion layer being responsible for ingesting all the data attributes 220 from the cloud and on-premise applications in the customer's ecosystem, i.e., client device 102. In one embodiment, there are possibly two ways in which data can be ingested from the customer's ecosystem into the ingestion layer of the automation platform 104. The first way is through real-time APIs, where data is ingested as soon as it is generated by the cloud or on-premise applications.

The second way is through ingesting data from logs or other sources within the customer's ecosystem, and later transforming it through the automation platform 104, and then updating the transformed data into the data lake 108. In this view, the ingestion layer plays a critical role in the automationautomation platform 104 by providing a unified approach to data ingestion and transformation, allowing for real-time analysis and processing of data across the organization.

Further, the automationautomation platform 104 may provide authentication and authorization services, via block 304, allowing users 114 to access products within third party ecosystem 306 whose data is stored at third party server 110. In one embodiment, third party ecosystem 306 may comprise of multiple integrations already built in the ecosystem 100. These integration adapters cater to different products under the agility, efficiency, and experience dimensions of the organization.

Each adapter in the customer's ecosystem works by connecting the automation platform 104 to a third-party product in the market, such as third party platform. For example, an adapter for the third party platform allows the automation platform 104 to connect with the third party platform instance endpoint and gain access to all its APIs. The real-time data from the third party platform is ingested by the API orchestration engine to provide insights to customers or it is ingested into the data lake 108 for future trending analysis and predictive insights.

This approach to integration provides a seamless and efficient way for customers to use their existing third-party products alongside the automation platform 104. This helps to maximize the value of existing investments in third-party products and provides a more comprehensive and integrated approach to IT automation.

In summary, customer's ecosystem provides a growing number of integration adapters that seamlessly connect third-party products with automation platform 104. This approach provides a unified approach to IT automation, leveraging existing investments in third-party products and delivering a more comprehensive and integrated approach to IT automation. In one case, the user 118 may access the products and services using their existing user credentials created in association with the automation platform 104. This ensures that there is a secure and seamless integration between the automation platform 104 and the customer's ecosystem 102, thereby providing a unified approach to identity organizational management.

In addition, the automation platform 104 may deliver a single sign-on capability, allowing users 114 to seamlessly navigate through products within third party's environment 306 without having to authenticate themselves again. This streamlines the user experience and reduces the need for multiple logins across different platforms. Further, the automation platform 104 also allows for dynamic roles for each of the personas in the organization, providing a custom set of permissions for each role. This enables a more granular approach to identity and access management, ensuring that users have access to only the resources they need to perform their roles.

In one case, the automation platform 104 seamlessly integrates with products in the third-party environment 306 that support Oauth2, SAML, and ODIC protocols, providing a flexible and scalable approach to identity management. In another words, the automation platform 104 plays a critical role in providing a unified approach to identity and access management. The automation platform 104 integrates platform's IAM component with the customer's IAM, delivering authentication and authorization services, a single sign-on capability, and dynamic roles for each persona in the organization.

Further, the automation platform 104 may transform the data attributes 220 into a unified format for further processing of the data attributes 220. In one case, the automation platform 104 may transform the data based on the needs from an architectural and business standpoint and loads all of that data real-time into the data lake 108. In one case, the data lake 108 may serve as the central repository for all the data that is being processed by the ecosystem 100 and analyzes to deliver automation across the agility, efficiency, and experience dimensions of the organization.

In an embodiment, there are two ways in which the automation platform 104 processes the data attributes 220. The first method is to use the service insights component to transform the data in real-time and provide an omni-channel experience 308 to customers. The second purpose of the automation platform 104 is to ingest the data and store it in the data lake 108, that stores massive amounts of data for trending, forecasting, analytics, and delivering predictive insights. The data lake 108 will also be used for machine learning.

By ingesting data from APIs of several products into the automation platform 104, ensures that the user 114 has access to the latest data in real-time, allowing for more accurate and timely analysis and decision-making. In this view, the automation platform 104 plays a critical role in ingesting data from APIs of several products into the automation platform 104. This helps to ensure a unified approach to data ingestion and processing, providing access to the latest data in real-time for accurate and timely analysis and decision-making. The data is stored in the data lake, which is used for trending, forecasting, analytics, and delivering predictive insights, as well as for machine learning.

Further, the automation platform 104 may serve as a framework to develop, manage, and execute all of the service providers within the automation platform 104. These service providers can be triggered automatically or through specific actions, schedules, or calendar events. Each service provider may have several critical paths that may get executed based on specific situations. In one case, the service providers within the automation platform 104 may execute various automation tasks, including reliability management, security automation, automated workflow pipeline, automated provisioning, root cause analysis with service maps, health check across infrastructure, correlation of alerts and events, a comprehensive view of enterprise applications, preventing outages and disruptions, conversational AI, computer vision, virtual agents, and employee request automation. The service providers may be gated into multiple areas, such as autonomous assurance, identity and access management, build automation, Active Directory services, app ops, infrastructure automation, ERP applications, threat intelligence, data management, infrastructure monitoring, vulnerability management, ITSM automation, compliance as code, Office 365, chatbots, collaboration, and virtual service desk.

Additionally, the service providers within the automation platform 104 may be triggered through multiple sources. First, they can be triggered through service requests in the ITSM application of the automation platform 104. A service request that has been assigned to the automation platform 104 may automatically be resolved by the service provider in the request handler 116 through classification of such service requests. The request handler 116 may analyze a nature of the service request, and accordingly identifies the appropriate service provider that needs to resolve that service request and triggers the service provider to execute the service request. Similarly, service providers in the automation platform 104 can be triggered by incidents for proactive healing or self-healing. Also, the service providers may also be triggered by conversational chatbots or self-service catalogues that employees can use to make requests.

In one case, examples of service requests that can be fulfilled through the automation platform 104 include requests for provisioning a server or certain infrastructure elements that need to be deployed on-premise or on the cloud. The service requests could also be related to maintenance of Office 365 components. For example, a manager can request an email ID for a new employee and add the employee to multiple distribution lists. The appropriate service provider in the automation platform 104 may execute all of these tasks, update the ticket, and let the manager know that the employee is ready to get started, and all of the service requests have been provisioned.

In this view, the automation platform 104 have provides a framework to develop, manage, and execute all of the service providers within the automation platform 104. The service providers can be triggered through various sources and can fulfill requests related to infrastructure management, security, compliance, and employee requests, among others. This approach to automation helps to improve efficiency, reduce errors, and provide a more comprehensive approach to IT automation.

Additionally, there's one prominent component of the automation platform 104 is the data lake 108, which serves as a central repository for all data ingested from various on-premise and cloud systems, i.e., client device 102 and third party server 118. All of the ingested data undergoes processing through transformation rules before being uploaded into the data lake 108. Additionally, data readily available through APIs is also ingested through the API Orchestrator and stored in the data lake 108.

The data lake 108 is used by multiple components of the automation platform 104 to provide analytics and predictive insights to user 114. For example, large volumes of data in a source system that cannot be ingested through APIs for real-time reporting can be transformed based on business logic and loaded into the data lake 108. Micro-services are then published through the automation platform 104 to provide insights in the Omni-Channel experience 308.

Another use case for the data lake 108 is in providing predictive insights. For instance, real-time data from infrastructure components may be available, but historical data may not exist to support trending and forecasting capabilities. In such cases, the data lake 108 stores data based on a certain frequency (e.g., hourly or daily) to build up data over time. This helps the automation platform 104 report on trending from a historical standpoint and also forecast utilization trends, allowing users 114 to make informed decisions to avoid business disruptions. Further, the automation platform 104 is to analyze and report on the trending and forecasting data stored in the data lake 108.

In one case, the automation platform 104 may consists of four key components: learning AI 310, cognitive AI 312, knowledge AI 314, and classification AI 316. The learning AI component is linked to the observability stack and is responsible for AI operations. It uses machine learning to detect anomalies and correlate data, which leads to effective noise reduction and eliminates false positives in the observability of infrastructure and application components.

The cognitive AI component focuses on enhancing self-service channels such as chatbots. By understanding user questions and behaviour, it passes that information back to the cognitive AI engine to determine the appropriate service provider to trigger from the service request, delivering an automated experience to fulfill the user's request without the need for human intervention.

The knowledge AI component is focused on real-time knowledge building to support engineers involved in managing customer portfolios. If a support engineer encounters a problem they are unsure how to solve, they can collaborate with the knowledge AI component within the automation platform 104 to get the appropriate steps to resolve the problem and fulfill the user's request. This component extensively uses multiple integration points, such as an ITSM platform, the knowledge base or repository that the automation platform 104 has at the back end, and a generative AI component.

Finally, the classification AI component is responsible for orchestrating the use of service provider in the automation platform 104 based on requests that come in for service provider-based resolutions triggered by various events such as incidents, service requests, chat communication, or other such events. The classification AI engine parses the request, understands which service provider to use, and designates that service provider for action to the specific triggering event.

Additionally, insight services 318 are a key component of the automation platform 104 and are designed to provide data-driven insights to users 114. These services are built by extracting data from various sources, including databases, APIs, streaming platforms, and other sources of data, and transforming and aggregating the data to create insights that can be consumed by an experience layer.

The process of building an insight service 318 involves identifying relevant data sources, integrating and transforming the data, and publishing the results as a service that can be consumed by users. The experience layer may take the form of dashboards, reports, visualizations, or APIs, providing a user-friendly interface that allows users to explore and interact with the data. In summary, the insight services 318 within the automation platform 104 utilize a micro-service architecture to provide data-driven insights to users by extracting, transforming, and publishing data from multiple sources for consumption by an experience layer.

In one example, the automation platform 104 is a web-based interface that provides end-users with a self-service portal to access and request services from an organization. The portal is fully customizable to match the organization's branding, making it familiar and more accessible for users. One of the key features of the service portal is the service catalogue, which allows users to browse and request services available in their organization. This includes IT services, HR services, facilities services, and more. The portal also includes a knowledge base, which can be integrated to provide users with self-help resources and answers to frequently asked questions.

Request tracking is another feature of the service portal, allowing users to track their request status and progress in real-time. This provides transparency and accountability for the services they have requested. The service portal integrates with the organizational workflows, automating service requests, approvals, and other processes. This increases efficiency and reduces manual work, resulting in a better user experience. Further, authentication and access control are also important features of the service portal. The service portal can authenticate users and apply access control to ensure that only authorized users can access and request specific services.

In this view, the service portal provides users with a streamlined and convenient way to request services, reducing the need for manual intervention and improving the overall user experience. Its integration with third party server 118 workflows and access control features ensures security and efficiency in service delivery.

In one case, in the automation platform 104, self-service channels 320 are an integral part of the user experience. These channels 320 include chatbots, the voice journey, and the self-service catalogue, all of which are designed to provide users with quick and efficient access to services without the need for human intervention. These self-service channels 320 leverage AI and automation to provide personalized experiences and enable users to resolve issues on their own.

Chatbots are virtual assistants that use NLP to understand user requests and route them to the appropriate service provider in the automation platform 104 to take desired action. By leveraging pre-built bots, automation platform 104 can provide users with efficient and personalized experiences while reducing the workload on human agents. The voice journey is another self-service channel that allows users to interact with automation platform 104 using voice commands through a phone call. By using NLP and speech recognition technology, automation platform 104 can understand the user's request and take action automatically.

The self-service catalogue is a web-based portal that allows users to make requests and access services without the need for human intervention. By using automation and classification AI, automation platform 104 may automatically route requests to the appropriate workflows or processes to remediate issues. The automation basic is a set of pre-built workflows and processes that can automate common tasks, such as password resets or device provisioning, while the automation platform 104 uses machine learning algorithms to analyze user requests and classify them accordingly.

In this view, the self-service channels 320 provide users with efficient and personalized experiences, enabling them to resolve issues quickly and reducing the workload on human agents. By leveraging AI and automation, automation platform 104 can understand and classify user requests accurately and provide the appropriate responses or remediation without the need for human intervention.

Figure 4:
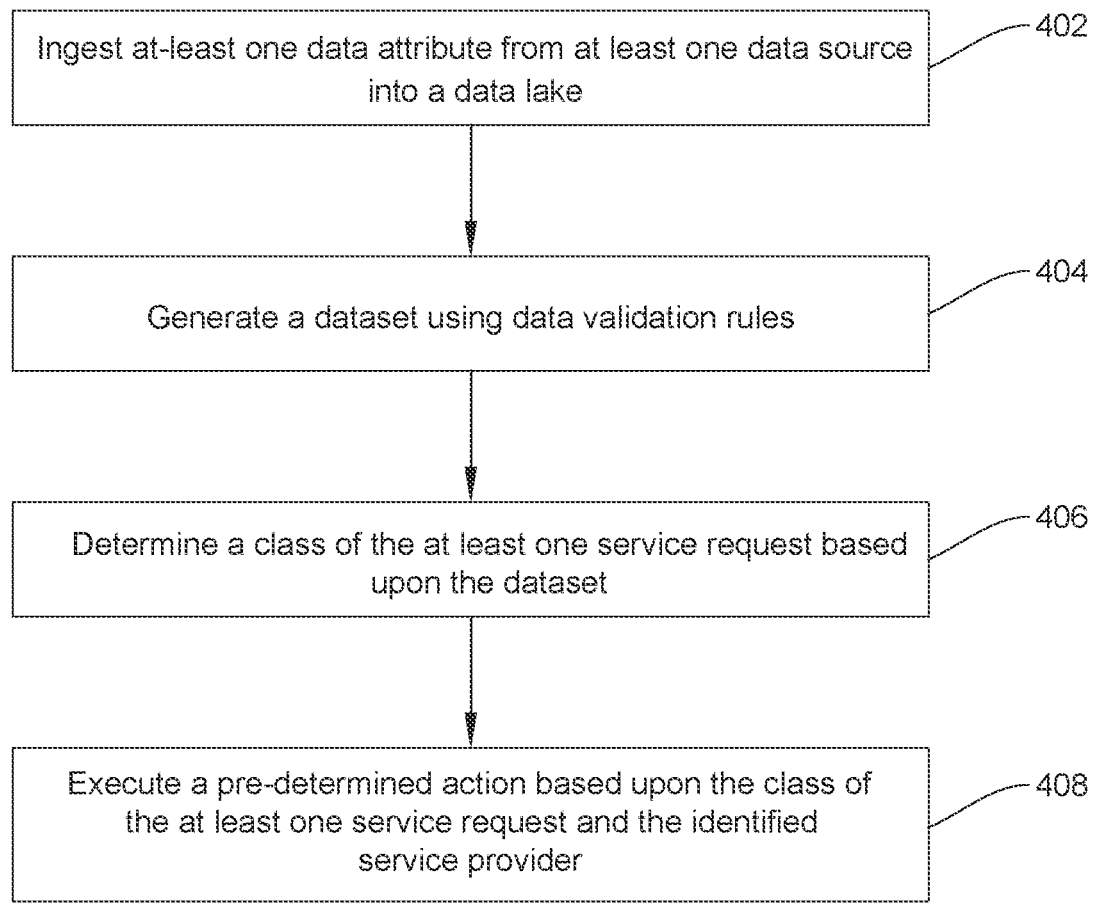
FIG. 4 illustrates a communication process for providing insights of an information technology ecosystem, in accordance with an embodiment of the present subject matter.

Further, the flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted at blocks 402 and 408 of FIG. 4 can be performed in parallel or concurrently.

At step 402, the system 100 is configured to operate an ingestion module 202 and ingesting at-least one data attribute from at least one data source into a data lake. More specifically, the ingestion module 202 ingests all the data from the cloud and on-premise applications in client's environment and transform it into a unified format for further processing of the at-least one data attributes.

At step 404, the system 100 is configured to operate a data analysis module 204 for generating a dataset using data validation rules, wherein the data validation rules convert the at-least one data attribute to a predetermined format, and for generating at least one service request. For an instance, the data analysis module 204 may transform the at-least one data attribute based on the needs from an architectural and business standpoint and loads all of that data in real-time into the data lake 108.

At step 406, the system 100 is configured to operate an automation module 206 for determining a class of the at least one service request. In one case, the class of at least one service request is determined based upon the dataset. In another case, the class of at least one service request identifies a service provider from a plurality of service providers; and At step 408, the system 100 is configured to operate the automation module 206 for executing a pre-determined action based upon the class of the at least one service request and the identified service provider, wherein the pre-determined action provides a predictive insight in real-time.

Although implementations of system and method for providing insights of an information technology ecosystem have been described in language specific to structural features and/or methods, it is to be understood that the appended claims are not necessarily limited to the specific features or methods described. Rather, the specific features and methods are disclosed as examples of implementations for providing insights of the information technology ecosystem.

I claim:

1. A system for providing insights of an information technology ecosystem, the system comprising:
   a processor; and
   a memory coupled to the processor, wherein the processor executes a plurality of modules stored in the memory, and wherein the plurality of modules comprising:
      an ingestion module for ingesting at least one data attribute from at least one data source into a data lake;
      a data analysis module for generating a dataset using data validation rules, wherein the data validation rules convert the at least one data attribute to a predetermined format, and for generating at least one service request;
      an automation module in communication with the ingestion module and the data analysis module, wherein a class of the at least one service request is determined based upon the dataset, and the class of at least one service request identifies a service provider from a plurality of service providers, and
      a pre-determined action is executed based upon the class of the at least one service request and the identified service provider, and the pre-determined action provides a predictive insight based on the class and one or more data attributes on a client device in real-time.

2. The system as claimed in claim 1, further comprising an integration adapter, for allowing a plurality of users to access a plurality of products associated with a third-party information technology ecosystem.

3. The system as claimed in claim 1, further comprises an Application Programming Interface (API) orchestrator operatively coupled to the automation module, for orchestrating the plurality of service providers based on the at least one service request to enable collaboration of the multiple users within the ecosystem.

4. The system as claimed in claim 1, further comprising, an authenticating and authorizing module, for allowing a plurality of users to access the information technology ecosystem and the third-party information technology ecosystem from multiple locations.

5. The system as claimed in claim 1, wherein the at least one data attribute comprises a real-time data, and/or a historical data received from the at least one data sources.

6. The system as claimed in claim 1, further comprises a security module, communicatively coupled to the system, wherein the said security module is configured to:
   receive a notification related to a non-steady state of the information technology ecosystem, wherein the automation module generates a set of risk profile data structures based upon the at least one data attributes to determine the non-steady state of the ecosystem;
   perform analysis by employing at least one of artificial intelligence technique on at least one data attributes; and
   generate a suggestive report to provide a favorable solution based upon the set of risk profile data structures, wherein the favorable solution indicates a list of factors responsible for non-processing of the one or more data attributes obtained from the at least one data sources.

7. The system as claimed in claim 1, further comprises predicting a standardized code
   classifying the at least one or more data attributes and automatically executing the predetermined action based on the at least one predictive parameter.

8. The system as claimed in claim 1, further comprising at least one service channel to:
   analyze a user behaviour and user questions pertaining to the at least one service request; and
   send to the user a tracking information about the service request.

9. A method for providing insights of an information technology ecosystem, the method comprising:
   ingesting at least one data attribute from at least one data source into a data lake;
   generating a dataset using data validation rules, wherein the data validation rules converts the at-least one data attribute to a predetermined format, and for generating at least one service request;
   determining a class of the at least one service request, wherein the class of at least one service request is determined based upon the dataset, wherein the class of at least one service request identifies a service provider from a plurality of service providers; and
   executing a pre-determined action based upon the class of the at least one service request and the identified service provider, wherein the pre-determined action provides a predictive insight based on the class and one or more data attributes on a client device in real-time.

10. The method as claimed in claim 9, further comprises at least one integration adapters, for allowing a plurality of users to access a plurality of products associated with the third-party information technology ecosystem.

11. The method as claimed in claim 9, further comprises an Application Programming Interface (API) orchestrator operatively coupled to the automation module, for orchestrating the plurality of service providers based on the service request to enable collaboration of the multiple users within the ecosystem.

12. The method as claimed in claim 9, further comprises an authenticating and authorizing service to allow the users to access the ecosystem and the third-party ecosystem from multiple locations.

13. The method as claimed in claim 9, wherein the at least one or more data attributes comprises a real-time data and/or historical data received from the at least one data source.

14. The method as claimed in claim 9, further comprises a security module, communicatively coupled to the system, wherein the said security module is configured to:

receive a notification related to a non-steady state of the information technology ecosystem, wherein the automation module generates a set of risk profile data structures based upon the at-least one data attributes to determine the non-steady state of the ecosystem;

perform analysis by employing at least one of artificial intelligence technique on at least one data attributes; and generate a suggestive report to provide a favorable solution based upon the set of risk profile data structures, wherein the favorable solution indicates a list of factors responsible for non-processing of the one or more data attributes obtained from the at least one data sources.

15. The method as claimed in claim 9, further comprises predicting a standardized code classifying the at least one or more data attributes and automatically executing the predetermined action based on the at least one predictive parameter.

16. The method as claimed in claim 9, further comprising at least one service channel to:

analyzing a user behaviour and user questions pertaining to the at least one service request; and sending to the user a tracking information about the service request.

\* \* \* \* \*